United States Patent
Akifusa

(10) Patent No.: US 8,271,108 B2
(45) Date of Patent: Sep. 18, 2012

(54) AUDIO PLAYBACK DEVICE AND PLAYBACK METHOD OF AUDIO PLAYBACK DEVICE

(75) Inventor: Hirokazu Akifusa, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 1681 days.

(21) Appl. No.: 11/437,848

(22) Filed: May 19, 2006

(65) Prior Publication Data

US 2006/0263065 A1    Nov. 23, 2006

(30) Foreign Application Priority Data

May 23, 2005    (JP) ................................. 2005-150181

(51) Int. Cl.
*G06F 17/00*    (2006.01)
(52) U.S. Cl. .................... 700/94; 369/47.15; 369/47.24; 369/69; 369/70; 369/92
(58) Field of Classification Search ............... 700/94
See application file for complete search history.

(56) References Cited

U.S. PATENT DOCUMENTS

| | | | |
|---|---|---|---|
| 6,246,401 B1 * | 6/2001 | Setogawa et al. | 715/723 |
| 6,567,609 B2 * | 5/2003 | Mori et al. | 386/98 |
| 6,745,164 B2 | 6/2004 | Akita | |
| 7,099,569 B2 * | 8/2006 | Gadre et al. | 386/125 |
| 2003/0031260 A1 * | 2/2003 | Tabatabai et al. | 375/240.25 |
| 2003/0110297 A1 * | 6/2003 | Tabatabai et al. | 709/246 |
| 2004/0017996 A1 | 1/2004 | Yamaguchi | |
| 2004/0028389 A1 * | 2/2004 | Naohara et al. | 386/96 |
| 2004/0047603 A1 * | 3/2004 | Tanaka et al. | 386/95 |
| 2004/0060009 A1 * | 3/2004 | Jung et al. | 715/513 |
| 2004/0170393 A1 * | 9/2004 | Heo | 386/96 |
| 2004/0190879 A1 * | 9/2004 | Saitou | 386/125 |
| 2006/0078278 A1 * | 4/2006 | Tajima | 386/46 |
| 2006/0259943 A1 * | 11/2006 | Kimura | 725/134 |
| 2007/0219934 A1 * | 9/2007 | Wang et al. | 707/1 |

FOREIGN PATENT DOCUMENTS

| | | |
|---|---|---|
| JP | 2001-338459 | 12/2001 |
| JP | 2004-229235 | 8/2004 |
| JP | 2005-116114 | 4/2005 |

OTHER PUBLICATIONS

ID3v2: informal standard; copyright Mar. 26, 1998.*

* cited by examiner

*Primary Examiner* — Paul McCord
(74) *Attorney, Agent, or Firm* — Brinks Hofer Gilson & Lione

(57) ABSTRACT

There is provided an audio playback device that prevents a user from losing an opportunity to use a content that is not playable on an AOP mode. In the case where the playback device functions on the AOP mode, when a DVD-Audio disk 1 being a subject of playback contains an ATT_GR that is not playable in the AOP mode, a navigation manager 11 of a DVD-Audio playback device displays such situation on a display device 15 via a display control unit. On the other hand, in the case where the playback device functions in a VCAP mode, when the DVD-Audio disk 1 being the subject of playback contains an ATT_GR that is playable only in the VCAP mode, the navigation manager 11 displays the ATT_GRN of the ATT_GR on the display device 15 via the display control unit to urge the user to use the ATT_GR.

6 Claims, 5 Drawing Sheets

| DISK IDENTIFIER | VCAP ONLY ATT_GRN | PLAYBACK-DONE FLAG |
|---|---|---|
| aaaa | 4 | PLAYBACK DONE |
| | 5 | PLAYBACK NOT DONE |
| bbbb | NA | |
| ⋮ | ⋮ | ⋮ |
| cccc | 1 | PLAYBACK NOT DONE |
| | 6 | PLAYBACK NOT DONE |
| | 8 | PLAYBACK NOT DONE |

VCAP ONLY ATT_GR CONTROL TABLE

FIG.3

| DISK IDENTIFIER | VCAP ONLY ATT_GRN | PLAYBACK-DONE FLAG |
|---|---|---|
| aaaa | 4 | PLAYBACK DONE |
| | 5 | PLAYBACK NOT DONE |
| bbbb | NA | |
| ⋮ | ⋮ | ⋮ |
| cccc | 1 | PLAYBACK NOT DONE |
| | 6 | PLAYBACK NOT DONE |
| | 8 | PLAYBACK NOT DONE |

VCAP ONLY ATT_GR CONTROL TABLE

FIG.5(a)

CAUTION!

THIS DISK CONTAINS AUDIO TITLE GROUP THAT CANNOT BE PLAYED BY THE CURRENT PLAYER MODE (AOP MODE).

FIG.5(b)

CAUTION!

THE SECOND AUDIO TITLE GROUP CONTAINED IN THIS DISK IS ONLY PLAYABLE ON THE CURRENT PLAYER MODE (VCAP MODE).

AUDIO PLAYBACK DEVICE AND PLAYBACK METHOD OF AUDIO PLAYBACK DEVICE

BACKGROUND OF THE INVENTION

1. Field of the Invention

The present invention relates to a technology of playback control in audio playback devices such as a DVD-Audio playback device that plays back a DVD-Audio disk.

2. Description of the Related Art

According to the DVD-Audio standards, a DVD-Audio playback device is permitted to function as a video-capable audio player (VCAP), which plays back and displays visual data such as video, still pictures and visual menus in addition to a playback audio data, and also function as an audio only player (AOP) that plays back only audio data but does not display the above-described visual data. Then, a DVD-Audio disk can contain an audio title (ATT) playable only on VCAP in addition to an ATT playable on both AOP and VCAP as contents.

Meanwhile, the DVD-Audio playback device that can function as a VCAP is generally capable of functioning also as an AOP in response to a user's selection or the like in many cases. Now, as the audio playback device capable of functioning both as the VCAP and the AOP, there is known a DVD-Audio playback device that functions as the VCAP when it can use a display device and functions as the AOP when it cannot use the display device (Japanese Patent Laid-Open No. 2004-22023 publication, for example).

Incidentally, some users sometimes let the DVD-Audio playback device function as the AOP even in the state where the DVD-Audio playback device can use the display device. This is because simpler operation of the device is possible when it is allowed to function as the AOP rather than the VCAP where the device can provide various operability using visual menus but user's operability often becomes complicated. Further, when the DVD-Audio playback device is applied as an on-vehicle audio device, there are cases where the DVD-Audio playback device is forcibly allowed to function as the AOP even when the DVD-Audio playback device can use a display device in order to prevent a driver from distraction when he/she drives a car.

However, when the DVD-Audio playback device is allowed to function as the AOP as described, there are cases where the user cannot play an ATT contain in the DVD-Audio disk, which is playable only on the VCAP, but also ends the use of the DVD-Audio disk without noticing the presence of the ATT. Then, in this case, a user's opportunity of watching the ATT playable only on the VCAP is lost as a result.

SUMMARY OF THE INVENTION

Consequently, it is an object of the present invention to provide an audio playback device including: the first playback mode for playing a content that consists of only audio data recorded in a recording medium; and the second playback mode for playing both the content that consists of only audio data and a content that consists of both audio data and visual data, which are recorded in the recording medium, in which a user is prevented from losing an opportunity to use the content playable only on the second playback mode.

To achieve the above-described object, the present invention is an audio playback device that includes two playback modes, which are a first playback mode operable to play back a first content that consists of only audio data recorded on a recording medium being played; and a second playback mode operable to play back both the first content that consists of only audio data and a second content that consists of both audio data and visual data, which are recorded on the recording medium played, and the device is operable to selectively operate in either of the two playback modes, in which the device includes: a content determination section operable to determine whether or not a content that is not playable in the first playback mode but playable only in the second playback mode, is recorded on the recording medium; and a message output section operable to generate a message notifying a user that the content playable only in the second playback mode is recorded on the recording medium if the content determination section determines that the content playable only in the second playback mode is recorded on the recording medium when the device operates in the first playback mode.

According to the audio playback device, in the case where the content playable only on the second playback mode for playing both the content that consists of only audio data and the content that consists of both audio data and visual data is recorded in the recording medium being the subject of playback when the device is in the first playback mode for playing only the content that consists of only audio data, the user is notified of such state to let the user recognize the presence of such content and it is possible to urge the user to use the content in the second playback mode.

Therefore, it is possible to prevent the user from losing an opportunity to use the content.

Herein, more specifically, the constitution of such an audio device can be applied for a DVD-Audio playback device that includes two playback modes, which are a VCAP mode for playing ATT_GR recorded in a DVD-Audio disk being the subject of a playback operation and an AOP mode for playing AOTT_GR recorded in the DVD-Audio disk being the subject of a playback operation, and selectively operates in either of the two playback modes. In this case, the DVD-Audio playback device should include: a title group determination section that determines whether or not an ATT_GR formed of ATTs that do not form the AOTT_GR is recorded in the DVD-Audio disk; and a message output section that generates a message notifying the user that an ATT_GR playable only on the VCAP mode is recorded in the DVD-Audio disk being the subject of a playback operation in the case where the title group determination section determines that the ATT_GR formed of the ATTs that do not form the AOTT_GR is recorded in the DVD-Audio disk being the subject of a playback operation when the device operates on the AOP mode.

Further, to achieve the above-described object, the present invention is an audio playback device that includes two playback modes, which are the first playback mode for playing a content that consists of only audio data recorded in a recording medium being a subject of playback; and the second playback mode for playing both the content that consists of only audio data and a content that consists of both audio data and visual data, which are recorded in the recording medium being the subject of playback, and selectively operates in either of the two playback modes, in which the device includes: a content determination section that determines whether or not a content, which is not playable in the first playback mode and playable only in the second playback mode, is recorded in the recording medium; and a message output section that generates a message notifying a user of an identification of a content playable only in the second playback mode, which is recorded on the recording medium being the subject of playback, in the case where the content determination section determines that the content playable only in the second playback mode is recorded in the recording medium being the subject of playback when the device operates in the second playback mode.

According to the audio playback device, in the case where the content playable only in the second playback mode is recorded in the recording medium being the subject of playback when the device is in the second playback mode for playing both the content that consists of audio data and the content that consists of both audio data and visual data, the user is notified of the identification of the content to urge the user to use the content, so that it is possible to prevent the user, who often use the audio playback device in the first playback mode for playing only contents that consist of only audio data, from losing an opportunity to use the content.

Herein, more specifically, the constitution of such an audio device can be applied for the DVD-Audio playback device that includes two playback modes, which are the VCAP mode for playing ATT_GR (Audio Title Group) recorded in the DVD-Audio disk being the subject of playback and the AOP mode for playing AOTT_GR (Audio Only Title Group) recorded in the DVD-Audio disk being the subject of playback, and selectively operates in either of the two playback modes. In this case, the DVD-Audio playback device should include: the title group determination section that determines whether or not an ATT_GR formed of ATTs that do not form the AOTT_GR is recorded in the DVD-Audio disk; and a message output section that generates a message notifying the user of an ATT_GRN (Audio Title Group Number) corresponding to the ATT_GR, which is formed of ATTs that do not form the AOTT_GR recorded on the DVD-Audio disk being the subject of playback, in the case where the title group determination section determines that the ATT_GR formed of the ATTs that do not form the AOTT_GR is recorded on the DVD-Audio disk being the subject of playback when the device operates in the VCAP mode.

Further, to achieve the above-described object, the present invention is an audio playback device that includes two playback modes, which are the first playback mode for playing a content that consists of only audio data recorded in a recording medium being a subject of playback; and the second playback mode for playing both the content that consists of only audio data and a content that consists of both audio data and visual data, which are recorded in the recording medium being the subject of playback, and selectively operates in either of the two playback modes, in which the device includes: a content determination section that determines whether or not a content, which is not playable in the first playback mode and playable only in the second playback mode, is recorded in the recording medium; and a preferential playback control section that controls the playback action of the audio playback device such that a content playable only in the second playback mode, which is recorded on the recording medium being the subject of playback, is played back preferentially to other contents in the case where the content determination section determines that the content playable only in the second playback mode is recorded in the recording medium being the subject of playback when the device operates in the second playback mode.

According to the audio playback device, in the case where the content playable only in the second playback mode is recorded in the recording medium being the subject of playback when the device is in the second playback mode for playing both the content that consists of audio data and the content that consists of both audio data and visual data, the device is controlled such that the content is played back preferentially. Therefore, an opportunity of the user to use the content increases.

Herein, more specifically, the constitution of such an audio device can be applied for the DVD-Audio playback device that includes two playback modes, which are the VCAP mode for playing ATT_GR recorded in the DVD-Audio disk being the subject of playback and the AOP mode for playing AOTT_GR recorded in the DVD-Audio disk being the subject of playback, and selectively operates in either of the two playback modes. In this case, the DVD-Audio playback device should include: the title group determination section that determines whether or not an ATT_GR formed of ATTs that do not form the AOTT_GR is recorded in the DVD-Audio disk; and the preferential playback control section that controls the playback action of the DVD-Audio playback device such that the ATT_GR formed of the ATTs, which do not form the AOTT_GR recorded in the DVD-Audio disk being the subject of playback, is played back preferentially to the other ATT_GR in the case where the title group determination section determines that the ATT_GR, which is formed of ATTs that do not form the AOTT_GR, is recorded in the DVD-Audio disk being the subject of playback when the device operates on the VCAP mode.

Furthermore, in this case, it is preferable that the preferential playback control section controls the playback action of the DVD-Audio playback device such that only ATT_GR, which has not been played back before on the DVD-Audio playback device, among the ATT_GRs formed of the ATTs that do not form the AOTT_GR recorded in the DVD-Audio disk being the subject of playback is played back preferentially to the other ATT_GRs.

Note that the constitution of each of the above-described audio playback devices may be applied by combining them appropriately. In the same manner, the constitution of each of the above-described DVD-Audio playback devices may be applied by combining them appropriately.

BRIEF DESCRIPTION OF THE DRAWINGS

FIG. 3 is a view showing a VCAP only ATT_GR control table that the DVD-Audio playback device according to the embodiment of the present invention has.

FIG. 5 is a view showing a display screen example that that the DVD-Audio playback device according to the embodiment of the present invention displays.

DETAILED DESCRIPTION OF THE PREFERRED EMBODIMENTS

In the following, an embodiment of the present invention will be described by using an application to a DVD-Audio playback device as an example.

Figure 1:
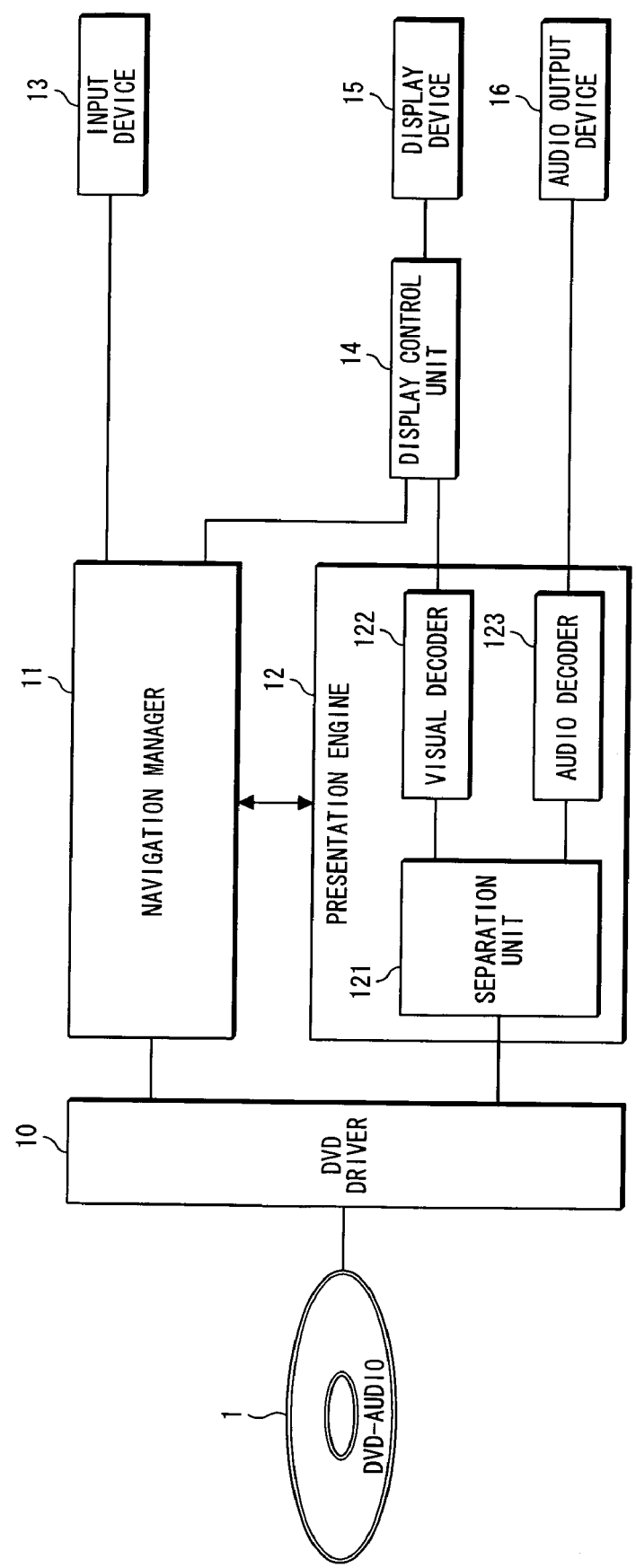
FIG. 1 is a block diagram showing a constitution of a DVD-Audio playback device according to an embodiment of the present invention.

FIG. 1 shows the constitution of a DVD-Audio playback device according to this embodiment.

As shown in the drawing, the DVD-Audio playback device includes: a DVD driver 10 that accesses and reads a DVD-Audio disk 1; a navigation manager 11 that controls a playback output action of the DVD-Audio disk 1; a presentation engine 12; an input device 13 that accepts an operation of a user; a display control unit 14; a display device 15; and an audio output device 16 such as a speaker that reproduces audio.

Herein, the DVD-Audio disk 1 stores navigation data being the playback control information of the DVD-Audio disk 1 and presentation data expressing the contents of presentation provided by the DVD-Audio disk 1 such as audio contents and visual contents. Then, the presentation engine 12 outputs playback of the presentation data that the DVD driver 10 has read out under the control of the navigation manager 11, and the navigation manager 11 controls the playback output action of the presentation data performed by the presentation engine 12 in response to the navigation data and a user operation input from the input device 13. However, the navigation manager 11 has the VCAP mode and the AOP mode as player modes, and switches the player mode in response to a user's selection or the like. Then, the navigation manger controls the playback output action of the presentation data such that the DVD-Audio playback device functions as the video-capable audio player (VCAP) when the VCAP mode is set as the player mode, and controls the playback output action of the presentation data such that DVD-Audio playback device functions as the audio only player (AOP) when the AOP mode is set as the player mode.

Next, the presentation engine 12 includes: a separation unit 121 that separates the presentation data, which the DVD driver 10 has read out under the control of the navigation manager 11, into audio data and visual data; a visual decoder 122 that decodes and plays back the visual data separated by the separation unit 121 and generates a video signal expressing a decoded and played-back image to the display control unit 14 when the VCAP mode is set; and an audio decoder 123 that decodes and plays back the audio data separated by the separation unit 121 and generates an audio signal expressing a decoded and played-back audio to the audio output device 16. Note that the visual data mentioned here is video data expressing a moving picture, still picture data expressing a still picture, data expressing a visual menu, and the like.

Then, in this constitution, the display control unit 14 controls a display of an image expressed by the video signal, which is produced by the visual decoder 122 of the presentation engine 12, on the display device 15. Further, the display control unit 14 also performs processing of displaying an image for an user interface, which the navigation manager 11 generates for the purpose of information notification to the user or accepting an instruction from the user when necessary, on the display device 15.

Note that the above-described DVD-Audio playback device may be a general-purpose computer that includes the DVD driver 10, the display device 15, the audio output device 16 and the input device 13 as peripheral devices. Then, in this case, the above-described navigation manager 11 and the presentation engine 12, or a part of them may be a process realized on the computer by executing a program.

Figure 2:
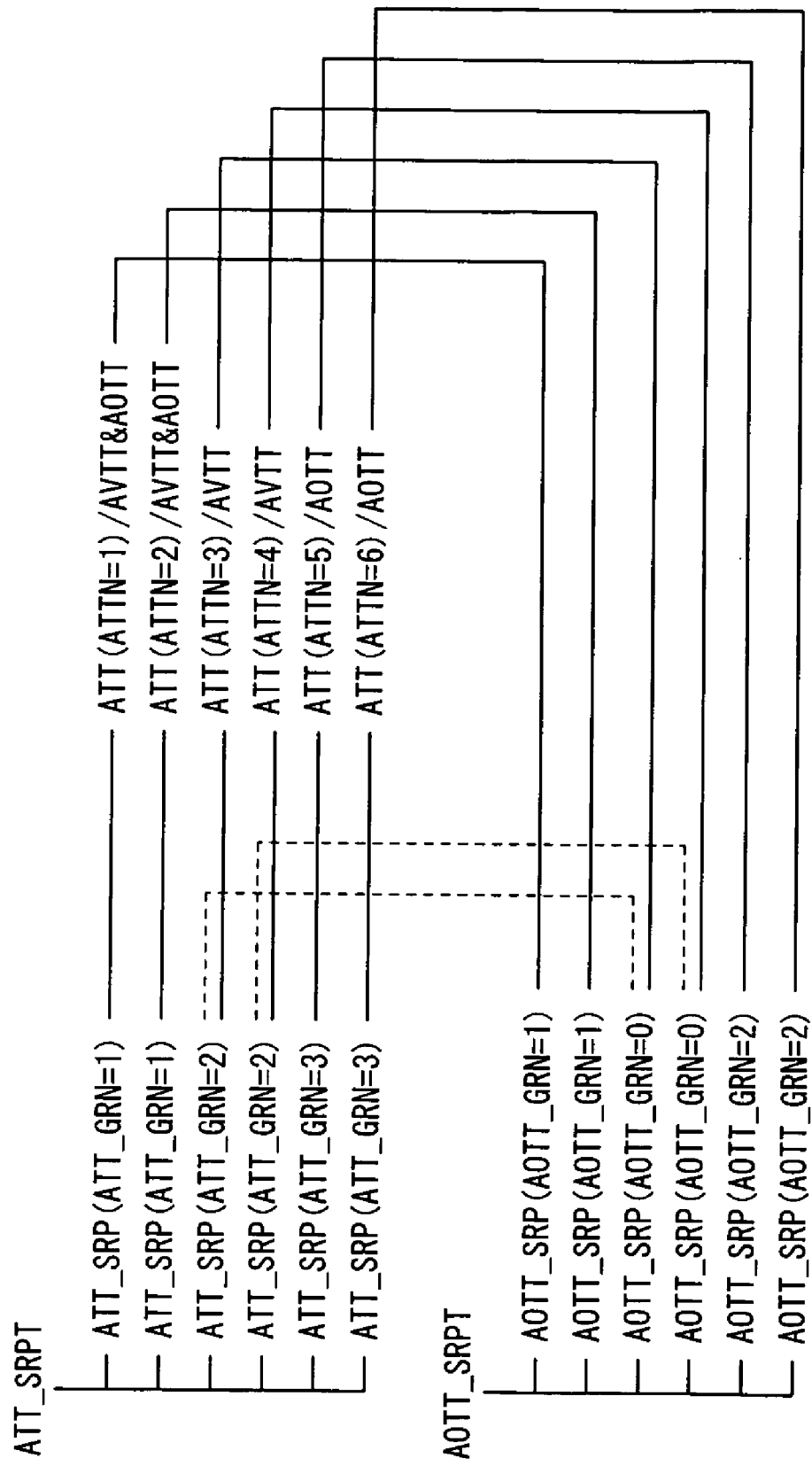
FIG. 2 is a view showing a logical playback structure of an audio title (ATT).

Next, FIG. 2 shows the logical playback structure of an audio title (ATT) recorded in the DVD-Audio disk 1.

As shown in the drawing, the DVD-Audio disk 1 can record a plurality of ATTs containing 1 or more tracks. Herein, the DVD-Audio playback device plays back the DVD-Audio disk 1 by using a group of tracks as a unit.

Furthermore, an audio title search pointer table ATT_SRPT and an audio only title search pointer table AOTT_SRPT are recorded in the DVD-Audio disk 1.

The ATT_SRPT specifies a group of tracks or an ATT that houses the tracks of each group for the DVD-Audio playback device functioning as the VCAP, and has an audio title search pointer ATT_SRP that points out ATTs that belong to each group. Herein, an audio title number (ATTN) is given to each ATT according to an order where corresponding ATT_SRP is contained in the ATT_SRPT. Further, in each ATT_SRP, an audio title group number ATT_GRN, which is the number of an audio title group ATT_GR being a group of tracks that the DVD-Audio playback device functioning as the VCAP uses, is written, and tracks contained in ATTs that are pointed out by ATT_SRPs to which the same ATT_GRN is written are tracks that belong to the same ATT_GR. Note that the ATT_SRP corresponding to each ATT_GR must be registered with the ATT_SRPT in the ascending order of the ATT_GRN.

Further, the AOTT_SRPT specifies a group of tracks or an ATT that houses the tracks of each group for the DVD-Audio playback device functioning as the AOP, and contains the audio only title search pointer AOTT_SRP corresponding to each ATT that is pointed out by an ATT_SRP contained in the ATT_SRPT in the same order as the order where the ATT_SRP pointing out corresponding ATT is contained in the ATT_SRPT. In other words, the AOTT_SRPT contains the AOTT_SRP corresponding to each ATT, which is pointed out by the ATT_SRP contained in the ATT_SRPT, in the order of the ATTN.

Furthermore, in the AOTT_SRP, an audio only title group number AOTT_GRN, which is the number of an audio only title group AOTT_GR being a group of tracks that the DVD-Audio playback device functioning as the AOP uses, is written, and each AOTT_SRP points out a corresponding ATT by an ATSN and ATS_TTN in the AOTT_SRP except for the case where 0 is written as the AOTT_GRN. Then, tracks contained in ATTs that are pointed out by ATT_SRPs to which the same AOTT_GRN is written are tracks that belong to the same AOTT_GR except for the case where 0 is written as the AOTT_GRN. Note that the AOTT_SRP corresponding to each AOTT_GR must be registered with the AOTT_SRPT in the ascending order of the AOTT_GRN except for a pointer on which 0 is written as the AOTT_GRN.

Then, the ATT corresponding to the AOTT_SRP on which 0 is written as the AOTT_GRN is an ATT that is played back only on the DVD-Audio playback device functioning as the VCAP and is not played back on the DVD-Audio playback device functioning as the AOP.

Further, the ATT_GR and the AOTT_GRN must satisfy the following relationship. In other words, an AOTT_GR must be formed by a set of ATTs forming an ATT_GR. In addition, ATTs, which are played back only on the DVD-Audio playback device functioning as the VCAP and are not played back on the DVD-Audio playback device functioning as the AOP, and ATTs that are played back on the DVD-Audio playback device functioning as the AOP must not be contained in the same ATT_GR.

Meanwhile, ATTs that are played back on the DVD-Audio playback device functioning as the VCAP are categorized into an AVTT containing video data and audio data and an AOTT containing only audio data. On the other hand, all ATTs to be played back on the DVD-Audio playback device functioning as the AOP are AOTTs. However, the AVTT in the DVD-Audio playback device can be an AOTT for playing back only audio data contained in the AVTT on the DVD-Audio playback device functioning as the AOP.

Now, as it is understood from the above-described relationship between the ATT_SRPT and the AOTT_SRPT, the ATT_GRN written on the ATT_SRP, which has the same order in the ATT_SRPT as the order of the AOTT_SRP in the AOTT_SRPT, to which 0 is written as the AOTT_GRN, becomes an ATT_GR formed by ATTs that are played back only on the DVD-Audio playback device functioning as the VCAP and are not played back on the DVD-Audio playback device functioning as the AOP. In the example shown in FIG. 2, the AOTT_GRNs of the third and the fourth AOTT_SRPs in the AOTT_SRPT are 0, so that 2, which is the ATT_GRN written on the third and the fourth ATT_SRPs of the ATT_SRPT (corresponding to ATT having ATTN of 3 and ATT having ATTN of 4), becomes the ATT_GRN of the ATT_GR formed by ATTs that are played back only on the DVD-Audio playback device functioning as the VCAP and are not played back on the DVD-Audio playback device functioning as the AOP.

Note that the ATT_GRN of the ATT_SRP is indicated by 4 lower-order bits in the first byte of 14 bytes of ATT_SRP, and the AOTT_GRN of the AOTT_SRP is indicated by 4 lower-order bits in the first byte of 14 bytes of AOTT_SRP.

Herein, for the convenience of explanation, an ATT_GR, which is formed by ATTs that are played back only on the DVD-Audio playback device functioning as the VCAP and are not played back on the DVD-Audio playback device functioning as the AOP, is called a "VCAP only ATT_GR", and the ATT_GRN of the VCAP only ATT_GR is called as a "VCAP only ATT_GRN".

Now, the navigation manager 11 holds a VCAP only ATT_GR control table being a table for controlling such VCAP only ATT_GRNs.

FIG. 3 shows a content of the VCAP only ATT_GR control table.

As shown in the drawing, the VCAP only ATT_GR control table has an entry for each DVD-Audio disk that has been played back on the DVD-Audio playback device, and it is possible to register a list of disk identifiers that become identifiers of the DVD-Audio disks 1 (a disk name of the DVD-Audio disk 1 or a feature value of the record data of the DVD-Audio disk 1, for example) and the VCAP only ATT_GRNs of VCAP only ATT_GRs recorded in the DVD-Audio disk 1 with each entry. Further, a playback-done flag indicating that a corresponding VCAP only ATT_GR has been played back or not is provided for each of the registered VCAP only ATT_GRNs.

In the following, description will be made for a playback start control processing that the navigation manager 11 performs in the DVD-Audio playback device.

Herein, regarding this playback start control processing, the user can selectively set a VCAP only ATT_GR preferential playback mode to the navigation manager 11 in advance.

Figure 4:
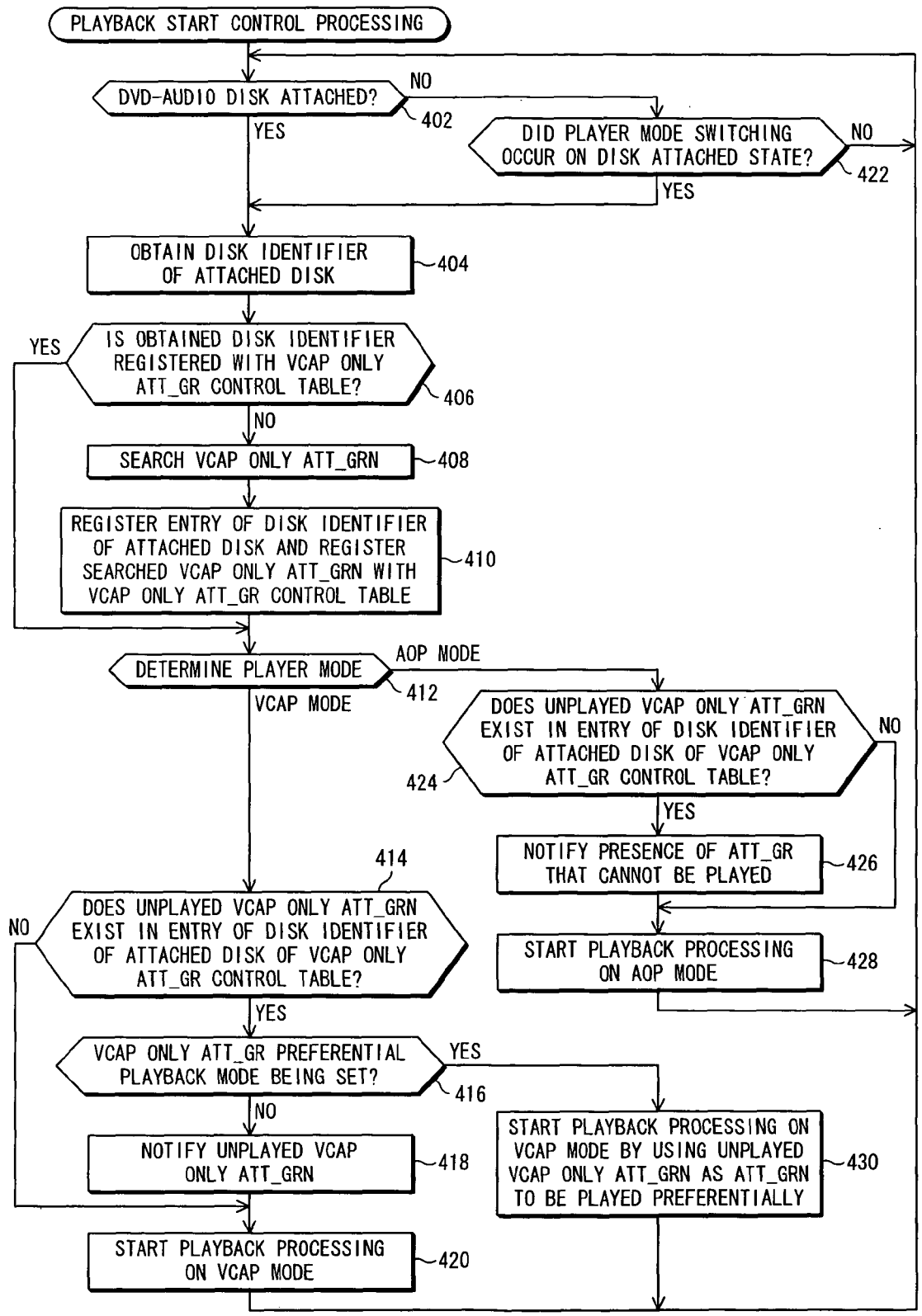
FIG. 4 is a flowchart showing a playback start control processing that the DVD-Audio playback device according to the embodiment of the present invention performs.

Now, as shown in FIG. 4, the playback device monitors an occurrence of attaching the DVD-Audio disk 1 on a DVD drive (step 402) and an occurrence of switching the player mode of the DVD-Audio playback device (step 422) in the state where the DVD-Audio disk 1 is attached on the DVD drive, in this playback start control processing.

Then, when either one occurs, the playback device obtains the disk identifier of the DVD-Audio disk 1 attached on the DVD drive (step 404). As described above, the disk name of the DVD-Audio disk 1, the feature value of record data of the DVD-Audio disk 1, or the like can be used as the disk identifier.

Next, it is checked whether or not an entry with which the obtained disk identifier has been registered already exists in the VCAP only ATT_GR control table (step 406), and processing proceeds to step 412 when it is registered.

On the other hand, when not existing, the playback device searches the VCAP only ATT_GRNs of the VCAP only ATT_GRs recorded in the attached DVD-Audio disk 1 (step 408). The VCAP only ATT_GRNs are found as the ATT_GRN written on the ATT_SRP, which has the same order in the ATT_SRPT as the order of the AOTT_SRP in the AOTT_SRPT, to which 0 is written as the AOTT_GRN, as described above. Then, the entry of the disk identifier obtained on step 404 is created on the VCAP only ATT_GR control table, and the list of each VCAP only ATT_GRN searched on step 408 is registered with the created entry (step 410). Herein, at this point, the playback-done flag of each registered VCAP only ATT_GRN is set to a value indicating playback not done. Further, in the case where no VCAP only ATT_GRN has been searched on step 408, NA for the VCAP only ATT_GRN is registered with the created entry instead of the list of VCAP only ATT_GRN, and processing proceeds to step 412.

On step 412, a currently set player mode is checked, and when the player mode is the AOP player mode, it is checked whether or not a list registered with the VCAP only ATT_GRN is contained in the entry with which the disk identifier on the VCAP only ATT_GR control table, which has been obtained on step 404, is registered (step 424). If the list is not contained, that is, when NA for the VCAP only ATT_GRN is registered with the entry, playback processing of the DVD-Audio disk 1 attached on the AOP mode is started (step 428), and processing returns to the one from step 402.

On the other hand, when the list registered with the VCAP only ATT_GRN is contained in the entry (step 424), a message as shown in FIG. 5(a) notifying that an ATT_GRN (VCAP only ATT_GR) that is not playable on the current player mode exists is displayed on the display device 15 for a certain period of time via the display control unit to let the user know the presence of such an ATT_GR and to urge him/her to use the ATT_GR in the VCAP mode (step 426). Then, the playback processing of the DVD-Audio disk 1 attached on the AOP mode is started (step 428), and processing returns to the one from step 402.

Note that step 424 may be a processing that proceeds to step 426 in the case where a list registered with the VCAP only ATT_GRN is contained in the entry with which the disk identifier of the VCAP only ATT_GR control table, which has been obtained on step 404, is registered and a VCAP only ATT_GRN to which the playback-done flag of a value indicating playback not done is registered with the list, and that proceeds to step 428 in other cases.

Now, when it is determined that the current player mode is the VCAP mode on step 412, whether or not the list registered with the VCAP only ATT_GRN is contained in the entry with which the disk identifier of the VCAP only ATT_GR control table, which has been obtained on step 404 and the VCAP only ATT_GRN to which the playback-done flag of a value indicating playback not done is set is registered with the list is checked (step 414). If it is not registered, the playback processing of the DVD-Audio disk 1 attached on the VCAP mode is started (step 420), and processing returns to the one from step 402.

On the other hand, when it is registered (step 414), whether or not the user has set the VCAP only ATT_GR preferential playback mode to the navigation manager 11 in advance is checked (step 416). If the mode is not set, a message as shown in FIG. 5b, for example, indicating that the ATT_GR of each VCAP only ATT_GRN, which is registered with the list contained in the entry with which the disk identifier obtained on step 404 is registered and to which the playback-done flag of a value indicating playback not done is set, is only playable on the current player mode (VCAP mode) is displayed on the display device 15 for a certain period of time via the display control unit (step 418) to urge the user to playback the VCAP only ATT_GR, the playback processing of the DVD-Audio disk 1 attached on the VCAP mode is started (step 420), and processing returns to the one from step 402.

On the other hand, in the case where the VCAP only ATT_GR preferential playback mode is set (step 416), an ATT_GRN being each VCAP only ATT_GRN, which is registered with the list contained in the entry with which the disk identifier obtained on step 404 is registered and to which the playback-done flag of a value indicating playback not done is set, is used as an ATT_GRN being a subject of preferential playback, the playback processing of the DVD-Audio disk 1 attached on the VCAP mode is started (step 430), and processing returns to the one from step 402.

Herein, every time the navigation manager 11, which has started the playback processing of the DVD-Audio disk 1 attached on the VCAP mode on the above-described step 420, plays back the VCAP only ATT_GR indicated by the VCAP only ATT_GRN of the VCAP only ATT_GR control table, which is registered with the list contained in the entry with which the disk identifier of the DVD-Audio disk 1 is registered and to which the playback-done flag of a value indicating playback not done is set, on the playback processing, it also performs a processing of changing the playback-done flag, which is contained in the list of the entry and provided for the VCAP only ATT_GRN of the played-back VCAP only ATT_GR, to a value indicating playback done.

Further, on step 430, the navigation manager 11 that has started the playback processing of the DVD-Audio disk 1 attached on the VCAP mode starts playback of the ATT_GR of the ATT_GRN that is set as the ATT_GRN being the subject of preferential playback. Furthermore, in the case where a plurality of ATT_GRNs are set as the ATT_GRN being the subject of preferential playback, the ATT_GR of each ATT_GRN is sequentially played back. However, when the user performs an operation of selecting an ATT_GR being the subject of playback, the ATT_GR according to the operation is played back. Further, every time the navigation manager 11 plays back the VCAP only ATT_GR indicated by the VCAP only ATT_GRN, which is registered with the list contained in the entry with which the disk identifier of the DVD-Audio disk 1 is registered and to which the playback-done flag of a value indicating playback not done is set, it also performs the processing of changing the playback-done flag, which is contained in the list of the entry and provided for the VCAP only ATT_GRN of the played-back VCAP only ATT_GR, to the value indicating playback done.

The playback start control processing performed by the navigation manager 11 has been described above.

Note that the above-described DVD-Audio playback device may not be provided with the VCAP only ATT_GR control table. In this case, steps 406 and 410 of the playback start control processing are omitted, processing proceeds directly from step 404 to step 408, and further proceeds directly from step 408 to step 412. Further, step 424 is allowed to be a processing to proceed to step 426 when a VCAP only ATT_GRN is searched on step 408 and proceed to step 428 when it is not searched. Furthermore, step 414 is allowed to be a processing to proceed to step 416 when the VCAP only ATT_GRN is searched on step 408 and proceed to step 420 when it is not searched, step 418 is allowed to be a processing to display a message of presenting the VCAP only ATT_GRN searched on step 408, and step 430 is allowed to be a processing to start the playback processing of the DVD-Audio disk 1 attached on the VCAP mode by using the VCAP only ATT_GRN searched on step 408 as an ATT_GRN being the subject of preferential playback.

Furthermore, in the above-described DVD-Audio playback device, the VCAP only ATT_GR preferential playback mode may not be used. In this case, step 416 of the playback start control processing is deleted, and processing proceeds directly to either step 418 or 430 instead of proceeding from step 414 to step 416.

The embodiment of the present invention has been described above.

As described, according to this embodiment, when the DVD-Audio disk 1 that has become the subject of playback on the AOP mode contains an ATT_GR playable only on the VCAP mode, the user is notified of the presence of such an ATT_GR. Therefore, it is possible to prevent the user from losing an opportunity of using it without noticing the presence of the ATT_GR. In addition, when the DVD-Audio disk 1 that has become the subject of playback in the VCAP mode contains an ATT_GR playable only on the VCAP mode, the user is notified of the ATT_GRN of such an ATT_GR or a processing of preferentially playing back the ATT_GR is performed. Therefore, the user's opportunity to use the ATT_GR can be secured more certainly.

As described above, according to the present invention, in the audio playback device including: the first playback mode for playing back a content that consists of only audio data recorded in the recording medium; and the second playback mode for playing back both the content that consists of only audio data and a content that consists of both audio data and visual data which are recorded in the recording medium, the user is prevented from losing an opportunity to use the content playable only on the second playback mode.

What is claimed is:

1. An audio playback device to play back a recording medium that includes a first playback mode operable to play back a first content on the recording medium that consists of only audio data, and a second playback mode operable to play back both the first content and a second content that consists of both audio data and visual data, the device selectively operable in either of the two playback modes, the device comprising:
   a content determination section operable to determine whether or not a content of the recording medium that is not playable in the first playback mode is playable only in the second playback mode;
   a message section operable to generate a message notifying a user that the content of the recording medium is playable only in the second playback mode if the content determination section determines that the content is playable only in the second playback mode;
   a preferential playback control section operable to control the playback action of the audio playback device such that the content playable only in the second playback mode is played back preferentially before other contents if the content determination section determines that the content is playable only in the second playback mode when the device operates in the second playback mode; and
   an audio title search pointer table and an audio only title search pointer table recorded on the recording medium and configured to facilitate audio playback.

2. The audio playback device of claim 1, wherein the content playable only in the second playback mode includes video data, and a new video that has not been played before by the device is played preferentially before other videos.

3. A DVD-Audio playback device that includes a video-capable audio player (VCAP) mode operable to play back a group of audio tracks (ATT_GR) recorded on the DVD-Audio disk being played, and an audio only player (AOP) mode operable to play back a group of audio only tracks (AOT-T_GR) recorded on the DVD-Audio disk being played, and selectively operates in either of the two playback modes, wherein the device comprises:
- a title group determination section operable to determine whether or not an ATT_GR formed of audio tracks (ATTs) that are not part of an AOTT_GR is recorded on the DVD-Audio disk;
- a message section operable to generate a message notifying a user that an audio title group number (ATT_GRN) corresponding to the ATT_GR that is playable only in the VCAP mode is recorded on the DVD-Audio disk being played if the title group determination section determines that the ATT_GR is formed of ATTs that are not part of the AOTT_GR;
- a preferential playback control section operable to control the playback action of the DVD-Audio playback device such that the ATT_GR formed of the ATTs that are not part of the AOTT_GR recorded on the DVD-Audio disk is played back preferentially before any other ATT_GR if the title group determination section determines that the ATT_GR formed of the ATTs that are not part of the AOTT_GR is recorded on the DVD-Audio disk when the device operates in the VCAP mode; and
- an audio title search pointer table and an audio only title search pointer table recorded on the recording medium and configured to facilitate audio playback.

4. The DVD-Audio playback device according to claim 3, wherein the preferential playback control section is operable to control the playback action of the DVD-Audio playback device such that a new ATT_GR that has not been played back before on the DVD-Audio playback device and that is formed of ATTs that are not part of the AOTT_GR recorded on the DVD-Audio disk is played back preferentially before the other ATT_GRs.

5. A playback method of a DVD-Audio playback device that includes a video-capable audio player (VCAP) mode operable to play back a group of audio titles (ATT_GR) recorded on the DVD-Audio disk being played, and an audio only player (AOP) mode for playing back a group of audio only titles (AOTT_GR) recorded on the DVD-Audio disk being played, and the device is operable to selectively operate in either of the two playback modes, the method comprising:
- determining whether or not an ATT_GR formed of audio tracks (ATTs) that are not included in an AOTT_GR is recorded on the DVD-Audio disk;
- generating a message notifying a user that the ATT_GR that is playable only in the VCAP mode is recorded on the DVD-Audio disk being played if it is determined that the ATT_GR formed of ATTs that are not included in the AOTT_GR is recorded on the DVD-Audio disk when the device operates in the AOP mode;
- controlling the playback action of the DVD-Audio playback device such that the ATT_GR is played back preferentially before the other ATT_GR if it is determined that the ATT_GR formed of the ATTs that are not included in the AOTT_GR is recorded on the DVD-Audio disk when the device operates in the VCAP mode; and
- facilitating audio playback using an audio title search pointer table and an audio only title search pointer table recorded on the recording medium.

6. The playback method of a DVD-Audio playback device according to claim 5, the method comprising controlling the playback action of the DVD-Audio playback device such that a new ATT_GR that has not been played back before on the DVD-Audio playback device is formed of ATTs that are not included in the AOTT_GR and is recorded on the DVD-Audio disk being played, the new ATT_GR is played back preferentially before the other ATT_GRs.

\* \* \* \* \*